US012641065B2

(12) United States Patent
Bellenger et al.

(10) Patent No.: US 12,641,065 B2
(45) Date of Patent: May 26, 2026

(54) EFFICIENT AND PROTECTED DATA TRANSFER SYSTEM AND METHOD

(71) Applicant: Visa International Service Association, San Francisco, CA (US)

(72) Inventors: Thomas Bellenger, Pacifica, CA (US); Manjush Gopinatha Menon, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 114 days.

(21) Appl. No.: 18/699,744

(22) PCT Filed: Sep. 23, 2022

(86) PCT No.: PCT/US2022/044609
§ 371 (c)(1),
(2) Date: Apr. 9, 2024

(87) PCT Pub. No.: WO2023/064086
PCT Pub. Date: Apr. 20, 2023

(65) Prior Publication Data
US 2024/0406151 A1 Dec. 5, 2024

Related U.S. Application Data

(60) Provisional application No. 63/255,421, filed on Oct. 13, 2021.

(51) Int. Cl.
*H04L 9/40* (2022.01)
*H04L 9/32* (2006.01)

(52) U.S. Cl.
CPC ........ *H04L 63/0435* (2013.01); *H04L 9/3213* (2013.01)

(58) Field of Classification Search
CPC . H04L 63/0435; H04L 9/3213; H04L 9/0866; G06Q 20/3821; G06Q 20/3829; G06Q 20/385
See application file for complete search history.

(56) References Cited

U.S. PATENT DOCUMENTS 8,631,230 B2 * 1/2014 Manges ................. H04L 67/34
713/153
9,825,923 B2 * 11/2017 Arunachalam ....... H04L 63/123
(Continued)

FOREIGN PATENT DOCUMENTS

KR     20000047650 A    7/2000
WO     2021119619 A1    6/2021

OTHER PUBLICATIONS

PCT/US2022/044609 , "International Search Report and the Written Opinion", Jan. 10, 2023, 10 pages.
(Continued)

*Primary Examiner* — J. Brant Murphy
(74) *Attorney, Agent, or Firm* — Kilpatrick Townsend & Stockton LLP

(57) ABSTRACT

A method is disclosed. The method includes receiving and storing, by a processing computer, a set of user data associated with a user, and an encrypted data packet from an authorizing entity computer, the encrypted data packet comprising sensitive data associated with the user encrypted using a first cryptographic key. The method includes receiving, from a user device, a request comprising at least some user data in the set of user data, determining the encrypted data packet corresponding to the at least some of the user data, and responsive to determining the encrypted data packet, obtaining a second cryptographic key. The method also includes decrypting the encrypted data packet with the second cryptographic key to obtain the sensitive data, and
(Continued)

processing a transaction using the sensitive data or a derivative thereof.

20 Claims, 7 Drawing Sheets

(56)                References Cited

U.S. PATENT DOCUMENTS

| | | | | |
|---|---|---|---|---|
| 10,461,933 | B2 * | 10/2019 | Le Saint ............. | H04L 63/0428 |
| 2014/0019753 | A1 * | 1/2014 | Lowry .................. | H04L 9/0894 |
| | | | | 713/155 |
| 2015/0089244 | A1 * | 3/2015 | Roth .................... | H04L 9/3226 |
| | | | | 713/193 |
| 2016/0218875 | A1 * | 7/2016 | Le Saint ............... | H04L 9/0822 |
| 2020/0186505 | A1 * | 6/2020 | Amar .................. | H04L 63/0435 |
| 2020/0287879 | A1 * | 9/2020 | Chandoor ........... | H04L 63/0807 |
| 2020/0372160 | A1 * | 11/2020 | Sundaram ............. | G06Q 10/10 |
| 2020/0404495 | A1 * | 12/2020 | Hegde ................ | H04L 63/0853 |
| 2021/0027297 | A1 * | 1/2021 | Wall ................... | G06Q 20/3821 |

OTHER PUBLICATIONS

EP22881550.2 , "Extended European Search Report", Sep. 23, 2024, 8 pages.

* cited by examiner

FIG. 3

EFFICIENT AND PROTECTED DATA TRANSFER SYSTEM AND METHOD

CROSS-REFERENCES TO RELATED APPLICATIONS

This application is a National Stage of International Application No. PCT/US2022/044609, dated Sep. 23, 2022, which claims priority to U.S. Provisional Application No. 63/255,421, filed on Oct. 13, 2021, which are herein incorporated by reference in their entirety.

BACKGROUND

Various systems can use payment credentials or tokens to conduct transactions such as transactions to access secure locations or to obtain resources such as goods and services. In such systems, payment credentials or tokens may be stored with a processing computer (which may be in the cloud). However, there may be some instances where the processing computer does not store the payment credentials or tokens such that they are readily available for a user to use in transactions. For example, a transaction being conducted by a user with a resource provider can be the first one involving the resource provider. In this case, the processing computer may need to affirmatively retrieve the user's credential or token from a party (e.g., an authorizing entity computer) that has possession of the credential or token. This can be problematic, because the process of retrieving the user's credential or token requires additional processing steps and takes additional time. If the connection between the processing computer and the party that holds the credential or token is poor, then it may not even be possible to obtain the credential or the token. In this case, the user may not even be able to conduct the intended transaction.

Embodiments of the invention address these and other problems, individually and collectively.

BRIEF SUMMARY

One embodiment of the invention includes a method comprising: receiving, by a processing computer, a set of user data associated with a user, and an encrypted data packet from an authorizing entity computer, the encrypted data packet comprising sensitive data associated with the user encrypted using a first cryptographic key; storing, by the processing computer, the set of user data associated with the user, and the encrypted data packet; receiving, by the processing computer from a user device, a request comprising at least some user data in the set of user data; determining, by the processing computer, the encrypted data packet corresponding to the at least some of the user data; responsive to determining the encrypted data packet, obtaining, by the processing computer, a second cryptographic key; decrypting, by the processing computer, the encrypted data packet with the second cryptographic key to obtain the sensitive data; and processing, by the processing computer, a transaction using the sensitive data or a derivative thereof.

Another embodiment of the invention includes a processing computer comprising: a processor; and a non-transitory computer readable medium comprising code, executable by the processor, for performing operations comprising: receiving a set of user data associated with a user, and an encrypted data packet from an authorizing entity computer, the encrypted data packet comprising sensitive data associated with the user encrypted using a first cryptographic key; storing the set of user data associated with the user, and the encrypted data packet; receiving, from a user device, a request comprising at least some user data in the set of user data; determining the encrypted data packet corresponding to the at least some of the user data; responsive to determining the encrypted data packet, obtaining a second cryptographic key; decrypting the encrypted data packet with the second cryptographic key to obtain the sensitive data; and processing a transaction using the sensitive data or a derivative thereof.

Another embodiment of the invention includes a method comprising: receiving, by an access device from a processing computer, a list of obscured credentials; receiving, by the access device from a user device, a selection of an obscured credential from the list of obscured credentials; transmitting, by the access device to the processing computer, the selected obscured credential, wherein the processing computer determines the encrypted data packet corresponding to the selected obscured credential, obtains a second cryptographic key corresponding to the obscured credential, and decrypts the encrypted data packet with the second cryptographic key to obtain the sensitive data; receiving, by the access device, the sensitive data or a derivative thereof from the processing computer; and transmitting, by the access device, the sensitive data or the derivative thereof to an authorizing entity computer for authorization.

Another embodiment of the invention includes an access device comprising a processor; and a computer readable medium, the computer readable medium comprising code executable by the processor to perform a method including: receiving, from a processing computer, a list of obscured credentials; receiving, from a user device, a selection of an obscured credential from the list of obscured credentials; transmitting, to the processing computer, the selected obscured credential, wherein the processing computer determines the encrypted data packet corresponding to the selected obscured credential, obtains a second cryptographic key corresponding to the obscured credential, and decrypts the encrypted data packet with the second cryptographic key to obtain the sensitive data; receiving the sensitive data or a derivative thereof from the processing computer; and transmitting the sensitive data or the derivative thereof to an authorizing entity computer for authorization.

These and other embodiments are described in further detail below.

BRIEF DESCRIPTION OF THE DRAWINGS

FIG. 3 shows a system and a flow diagram according to embodiments.

DETAILED DESCRIPTION

Figure 1:
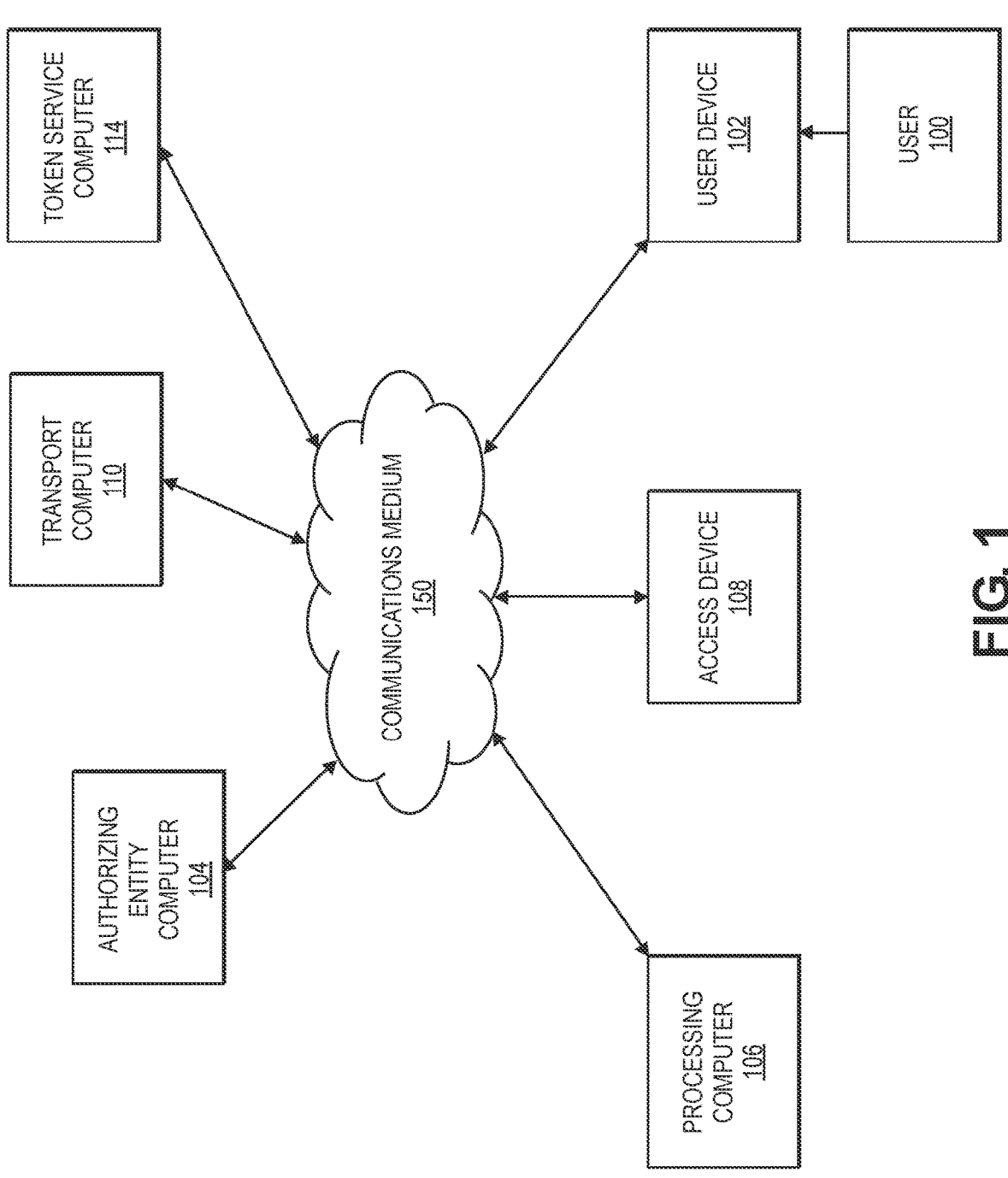
FIG. 1 shows a prior system and a flow diagram.

Prior to discussing embodiments of the invention, some terms can be described in further detail.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

A "symmetric key" can be a cryptographic key that is used to both encrypt and decrypt information.

An "access device" may be any suitable device that provides access to a resource. An access device may be in any suitable form. Some examples of access devices include a Web server operating a website such as a merchant website, vending machines, kiosks, POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), and the like.

"Access data" may include any suitable data that can be used to access a resource or create data that can access a resource. In some embodiments, access data may be account information for a payment account. Account information may include a PAN, payment token, expiration date, card verification values (e.g., CVV, CVV2), dynamic card verification values (dCVV, dCVV2), an identifier of an issuer with which an account is held, etc. In other embodiments, access data could include data that can be used to access a location or to access secure data. Such information may be ticket information for an event, data to access a building, transit ticket information, passwords, biometrics or other credentials to access secure data, etc.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the user.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more access devices.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user" may include an individual. In some embodiments, a user may be associated with one or more personal accounts and/or user devices.

A "user device" may be any suitable device that is operated by a user. Suitable user devices can be portable, and can communicate with external entities such as access devices. Examples of user devices include mobile communication devices such as mobile phones, laptop computers, transponders, wearable devices such as smart watches, automobiles with remote communication capabilities, access cards, smart media, etc.

A "mobile communication device" may comprise any suitable electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of value credentials include payment credentials, coupon identifiers, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided to make a payment from a payment account. Payment credentials can also include a user name, an expiration date, a gift card number or code, and any other suitable information.

A "token" may be a substitute value for a credential. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle, or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization.

For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g., token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e., token domain restriction controls) may be established as part of token issuance by the token service computer that may allow for enforcing appropriate usage of the token in payment transactions. For example, the token domain restriction controls may restrict the use of the token with presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g., a 4-digit numeric value). In some embodiments, the token expiry date can be expressed as a time duration as measured from the time of issuance.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers. A server computer may also be a cloud server.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet to make a payment without having to enter an account number or present a physical card.

A "digital wallet provider" may include an entity, such as an issuing bank or third party service provider, which issues a digital wallet to a user that enables the user to conduct financial transactions. A digital wallet provider may provide standalone user-facing software applications that store account numbers, or representations of the account numbers (e.g., payment tokens), on behalf of a user (or other user) to facilitate payments at more than one unrelated merchant, perform person-to-person payments, or load financial value into the digital wallet. A digital wallet provider may enable a user to access its account via a personal computer, mobile communication device or access device.

FIG. 1 shows a system including several computers that can communicate via a communication medium 150. The entities can include a user 100 which can use a user device 102. The user device 102 can be in communication with at least the authorizing entity computer 104, the processing computer 106, and the access device 108. In some embodiments, the processing computer 106 may be run by a processing computer in a payment processing network or an access control network. The processing computer 106 can be in communication with at least the user device 102, the authorizing entity computer 104, the access device 108, the transport computer 110, and the token service computer 114. Exemplary illustrations of how the computers in FIG. 1 can communicate with each other and process data are provided below.

The computers in the system of FIG. 1 and any of the following figures can be in operative communication with each other through any suitable communications medium. Suitable examples of the communications media may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocols such as, but not limited to Secure Hypertext Transfer Protocol (HTTPS).

Figure 2:
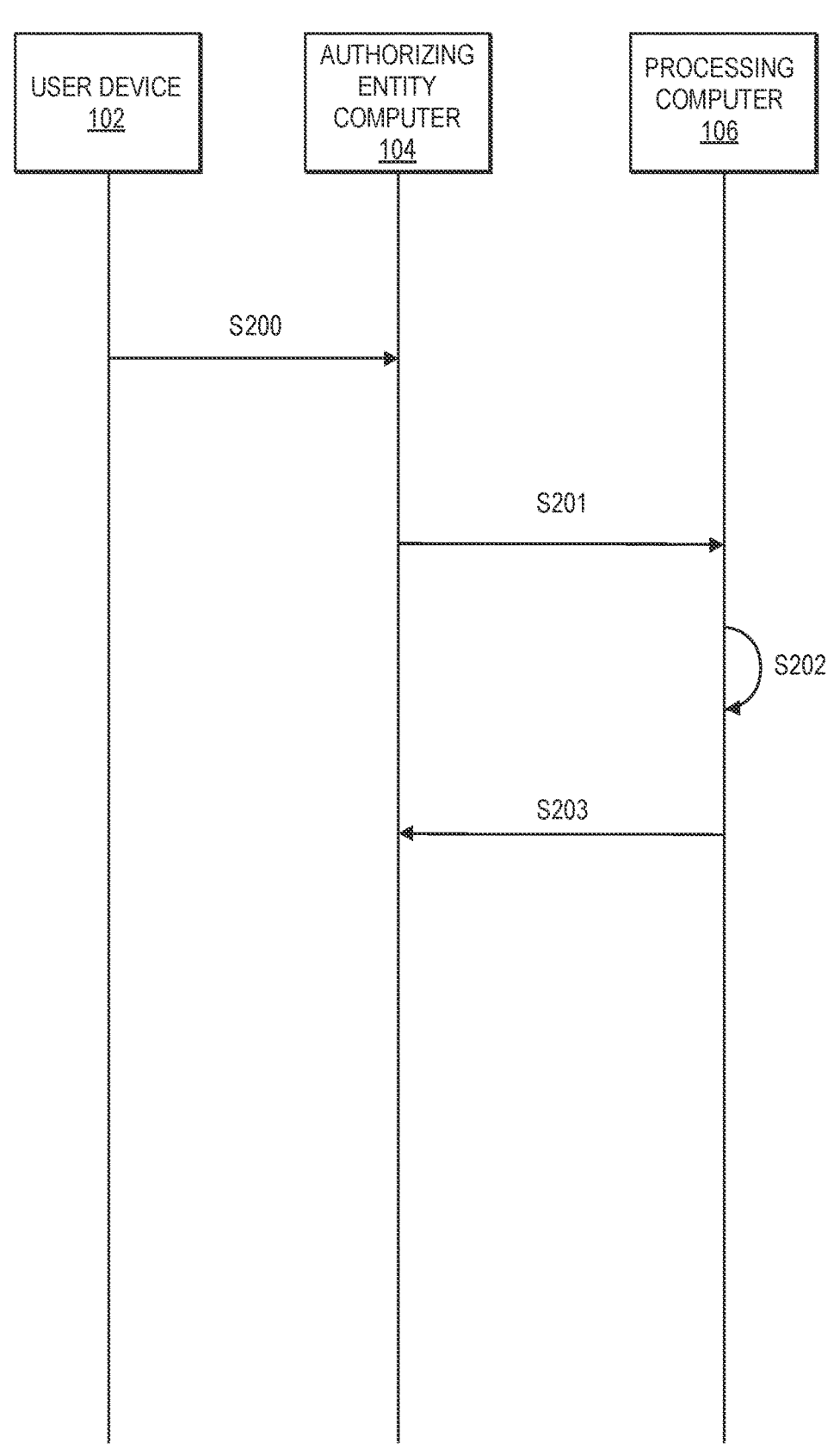
FIG. 2 show a system and a flow diagram according to embodiments.

FIG. 2 shows a system including an authorizing entity computer 104 and a processing computer 106. The authorizing entity computer 104 could be a computer that can authorize transactions such as secure access transactions and payment transactions. The processing computer 106 may be in communication with the authorizing entity computer 104, and part of a data network such as an access network or a payment processing network.

FIG. 2 also shows a process flow that illustrates an enrollment process, where a user using a user operating the user device 102 request enrollment of a credential or a token with the processing computer 106 for future transactions.

In step S200, which is optional, the user using the user device 102 can communicate with the authorizing entity computer 104. The communication may indicate the user's agreement to allow the processing computer 106 to store or access a credential of the user and/or a token based upon the credential. For example, the credential could be an employee access identification number, a transit identification number, a primary account number (e.g., a PAN), and/or any associated data (e.g., expiration dates, verification values, etc.).

In step S201, after the entity that operates the authorizing entity computer 104 receives the communication from the user device 102 in step S200, a set of user data can be sent by the authorizing entity computer 104 to the processing computer 106. The set of user data can include non-sensitive data and sensitive data. Non-sensitive data can include information such as the user's e-mail address (an example of contact information of the user), a hash of the phone number, credential reference identifier (e.g., a payment card identifier), device art (e.g., graphics associated with a device that holds or is associated with a credential), an obscured credential (e.g., the last four digits of the user's payment or identification card), and in the case of payments, a funding source (e.g., checking account, credit card account, debit card account, etc.). Exemplary sensitive data can include, but is not limited to the user's actual credential (e.g., an actual payment card number such as a PAN, expiration date, and/or CVV), the user's phone number, and a biometric of the user, etc. The sensitive data can be encrypted into an encrypted data packet (or encrypted blob) using a cryptographic key. The cryptographic key can be a symmetric or an asymmetric key (e.g., a public key associated with a processing computer public-private key pair).

In some embodiments, the cryptographic key is a first cryptographic key, which is a symmetric key that is derived from at least some user data in the set of user data, and optionally one or more shared secrets between the process computer 106 and the authorizing entity computer 104. As an example, the first encryption key can be generated using the user's e-mail address, a hash of the user's phone number, the last four digits of the user's credential, and a shared secret such as a secret code that is shared between the authorizing entity computer 104 and the processing computer 106. The use of the non-sensitive data to generate the first cryptographic key is advantageous, since doing so provides a unique cryptographic key for the user and the processing computer 106 can readily generate a second cryptographic key at a later time without storing the actual first cryptographic key thereby saving memory. Still further, the generation of the first cryptographic key (and a subsequent second cryptographic key) in this manner makes it difficult for a hacker or a man-in-the-middle to determine or obtain the first cryptographic key since it is not stored in a persistent manner in the processing computer 106, but is derived on demand.

In step S202, before or after the sensitive data is encrypted, a profile for the user may be created by the processing computer 106 and is saved by the processing computer 106. The processing computer 106 can generate a user profile identifier for the user's profile, and can store the user's non-sensitive data and the user's sensitive data in encrypted form in associated with the user profile identifier. The user's sensitive data can then be deleted, so the processing computer 106 does not store the user's sensitive data in the clear. At this point, the user's credential is ready for activation when the user decides to conduct an interaction with an access device operated by a resource provider.

In step S203, a confirmation response indicating that the user profile has been created is sent from the processing computer 106 to the authorizing entity computer 104. A further confirmation response may also be sent to the user device 102.

Figure 3:
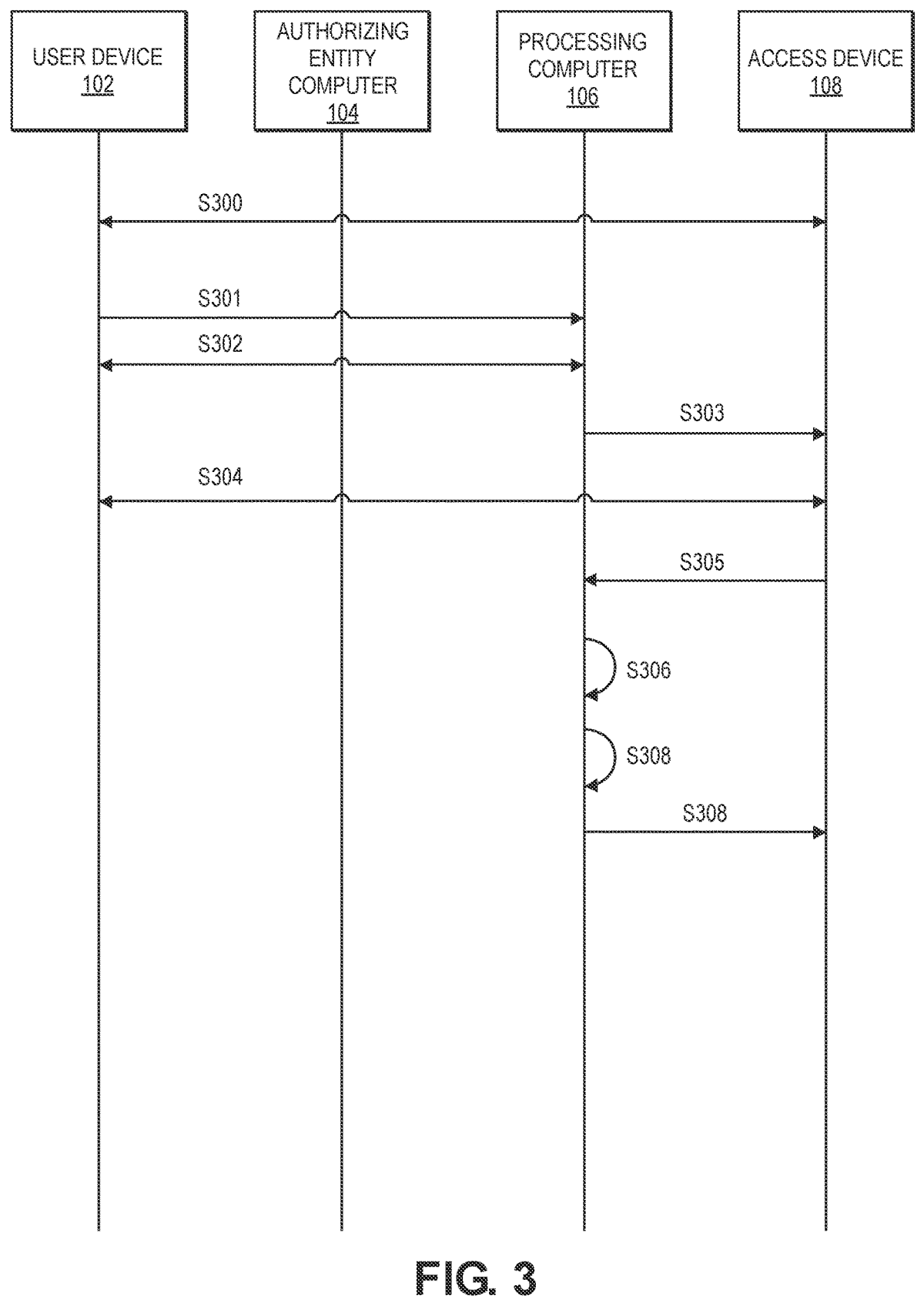

FIG. 3 shows a system and an activation and processing flow according to embodiments. FIG. 3 shows a user device 102 in communication with an access device 108 and the processing computer 106. The access device 108 may also be in communication with the processing computer 106. An authorizing entity computer 104 is shown, and can be in communication with the processing computer 106 as in FIG. 2, but does not participate in the flow illustrated in FIG. 3. In the flow in FIG. 3, the user operating the user device 102 is interacting with the access device 108, which may be operated by a resource provider such as a provider that provides secure access to a secure location or that provides access to goods and/or services. An example of a resource provider is a merchant. In the flow of FIG. 3, the user of the user device 102 may not have activated or used their credential in a transaction involving an access device or the processing computer 106.

In step S300, a user operating a user device 102 an interact with an access device 108 to conduct a transaction. For example, the access device 108 could be a Web server which allows the user to access a resource such as a secure location, secure data, or goods and/or services provided by a resource provider. In a specific example, the access device 108 can be a merchant Web server. At some point, the access device 108 may present the user with an opportunity to use a credential to complete the transaction. If, for example, the access device 108 is a merchant Web server, then the user operating the user device 102 may have selected a number of goods to purchase, and then may be presented with checkout options.

The access device 108 may display a page to the user device 102 and the user which allow the user to retrieve a credential using the processing computer 106. As an example, if the access device 108 is a merchant Web server, then the user may be presented with an option to contact the processing computer 106 to obtain the credential or a derivative thereof (e.g., a token such as a payment token) to continue to process the transaction. In some cases, the processing computer 106 may include a digital wallet server that operates a digital wallet, and the user of the user device 102 may be presented with the digital wallet and may access the digital wallet to obtain the credential or derivative thereof to complete the transaction.

In step S301, the user operating the user device 102 using the user device 102 can interact with the processing computer 106. The user operating the user device 102 may provide contact information such as an e-mail and/or phone number, or processing computer 106 login data (e.g., a username and password) to the processing computer 106.

In step S302, the processing computer 106 can either use the contact information that is received, or it can look up the user's contact information in the user's profile complete an OTP (one time password) authentication process with the user. Note the use of an OTP process is one example of an authentication process and other authentication processes can be used in other embodiments.

In step S303, after the user of the user device 102 has authenticated themselves with the processing computer 106, the processing computer 106 can communicate a list of the user's credentials in obscured form to the access device 108 operated by the resource provider. Although the user's credentials are in obscured form, they are in a form that is recognizable by the user. For example, a primary account number that is sixteen digits long can be represented by its last four digits. The user will recognize which credential is associated with the obscured credential, but the credential is obscured such that it is useless to an unauthorized person. Although one authorizing entity computer 104 was shown and described in the enrollment process above with respect to FIG. 2, the user of the user device 102 may be affiliated with many authorizing entities (e.g., many financial institutions) operating authorizing entity computers. As such, the processing computer 106 can store a profile for the user of the user device 102 and it may contain encrypted data packets of credentials from different authorizing entity computers.

In step S304, after getting the list of obscured credentials, the resource provider operating the access device 108 can receive a selection to activate one of the obscured credentials from the user operating the user device 102.

In step S305, the access device 108 can return the selected obscured credential to the processing computer 106.

In step S306, the processing computer 106 look up the encrypted data packet (e.g., blob) corresponding to the selected obscured credential, and may then decrypt the encrypted sensitive data described in FIG. 2 using a second cryptographic key to obtain the sensitive data including the credential in plaintext form. In some embodiments, the processing computer 106 can generate the second cryptographic key in the same manner as the first cryptographic key was generated in the enrollment process described above with respect to FIG. 2.

In step S306, in some embodiments, the processing computer 106 can optionally use the credential to obtain a token (which can be a derivative of the credential) which can mask the credential during the subsequent steps of the transaction. The processing computer 106 can have an internal token determination module or can communicate with a token service computer (not shown) to obtain a token for the credential. The token may either be selected from a pool of pre-existing tokens or may be mathematically determined based upon the credential.

In step 307, the processing computer 106 can process the transaction using the token (or the credential if a token is not obtained). For example, the processing computer 106 can provide a payload which may include the token to the access device 108. In other embodiments, the credential can be passed from the processing computer 106 to the access device. Once the access device 108 has the token or the credential, the access device 108 can continue to process the transaction using the credential (which is an example of the sensitive data) or the token (which is an example of a derivative of the sensitive data). Further exemplary details on how the access device 108 can continue to process transactions using the credential or token are described above with respect to FIGS. 7 and 8.

The process flow in FIG. 3 has advantages over other systems and methods where the processing computer needs to communicate with an entity to retrieve a credential after a user decides to use or activate the credential when conducting a transaction with an access device operating a resource provider computer. For example, the communications with the authorizing entity computer 104 are not needed in the flow in FIG. 3, thereby saving time and reducing the complexity of the process. Further, since the sensitive data is encrypted at the processing computer and is not persistently stored as plaintext data at the processing computer, it is secure from hackers. Further, the sensitive data remains encrypted only until a legitimate user (who has been properly authenticated) expresses an intent to use the sensitive data to conduct a transaction. In some embodiments, user need not be aware that their credential is available for activation, and would only be informed of this when they want to conduct an actual transaction.

Figure 4:
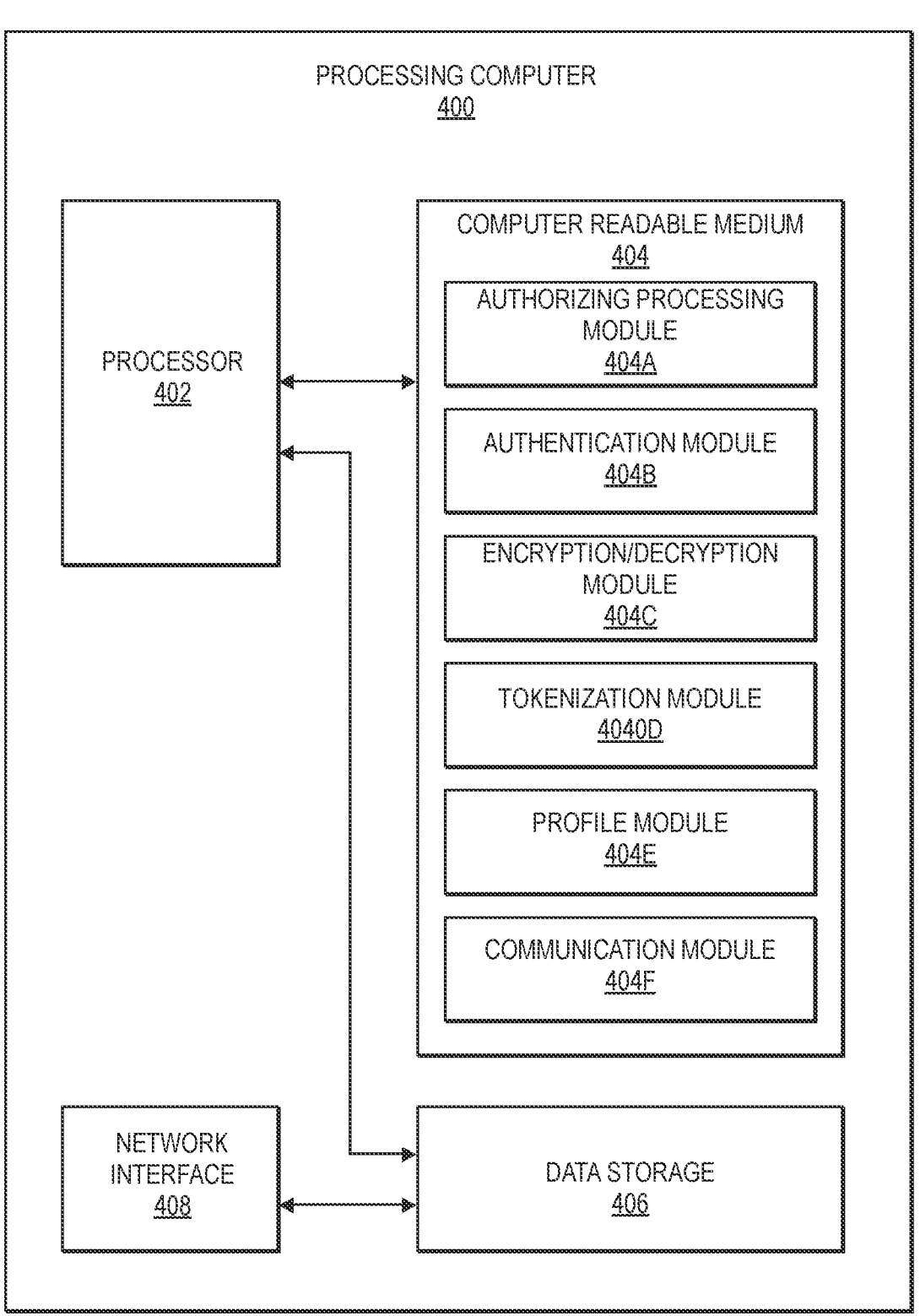
FIG. 4 shows a flow diagram of a processing computer according to embodiments.

FIG. 4 shows a block diagram of a processing computer 400 according to an embodiment. The processing computer 400 may comprise a processor 402, which may be coupled to a computer readable medium 404, a data storage 406, and a network interface 408. The data storage 406 may contain profile information of users along with encrypted data packets, and non-sensitive data, contact information of users, token pools for token selection, etc.

The computer readable medium 404 may comprise several software modules including an authorization processing module 404A, an authentication module 404B, an encryption/decryption module 404C, a tokenization module 404D, a profile module 404E, and a communication module 404F. The computer readable medium may also comprise a clearing and settlement module (not shown).

The authorization processing module 404A may comprise code that can cause the processor 402 to evaluate authorization request messages for transactions and determine if the transactions should be authorized. The authorization processing module 404A may also include code for routing or modifying authorization request and response messages as they pass between various parties such as authorizing entity computers (e.g., issuer computers) and transport computers (e.g., acquirer computers).

The authentication module 404B may comprise code that can cause the processor 402 to authenticate users, such as through the use of OTPs (one time passwords), biometrics, or the like.

The encryption/decryption module 404C may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption/decryption module 404C may utilize symmetric or asymmetric encryption techniques to encrypt and/or verify data. Cryptographic keys that may be used by the encryption/decryption module 404C may generated on an as needed basis as described above and deleted when they are not needed, or they can be securely stored in the data storage 406 in other embodiments.

The tokenization module 404D can comprise code that causes the processor 402 to obtain or generate tokens. The tokens can be derivatives of real credentials. For example, a token can be selected from a pool of tokens after a credential is obtained, and the token can then be mapped to the credential. In other embodiments, the token can be mathematically derived from the credential using an algorithm.

The profile module 404E can comprise code which causes the processor 402 to generate and maintain the profiles of users, and to create profile identifiers.

The communication module 404F may comprise code that causes the processor 402 to generate messages, forward messages, reformat messages, and/or otherwise communicate with other entities.

The computer readable medium 404 can comprises code, executable by the processor 402, for performing operations comprising: receiving a set of user data associated with a user, and an encrypted data packet from an authorizing entity computer, the encrypted data packet comprising sensitive data associated with the user encrypted using a first cryptographic key; storing the set of user data associated with the user, and the encrypted data packet; receiving, from a user device, a request comprising at least some user data in the set of user data; determining the encrypted data packet corresponding to the at least some of the user data; responsive to determining the encrypted data packet, obtaining a second cryptographic key; decrypting the encrypted data packet with the second cryptographic key to obtain the sensitive data; and processing a transaction using the sensitive data or a derivative thereof.

Figure 5:
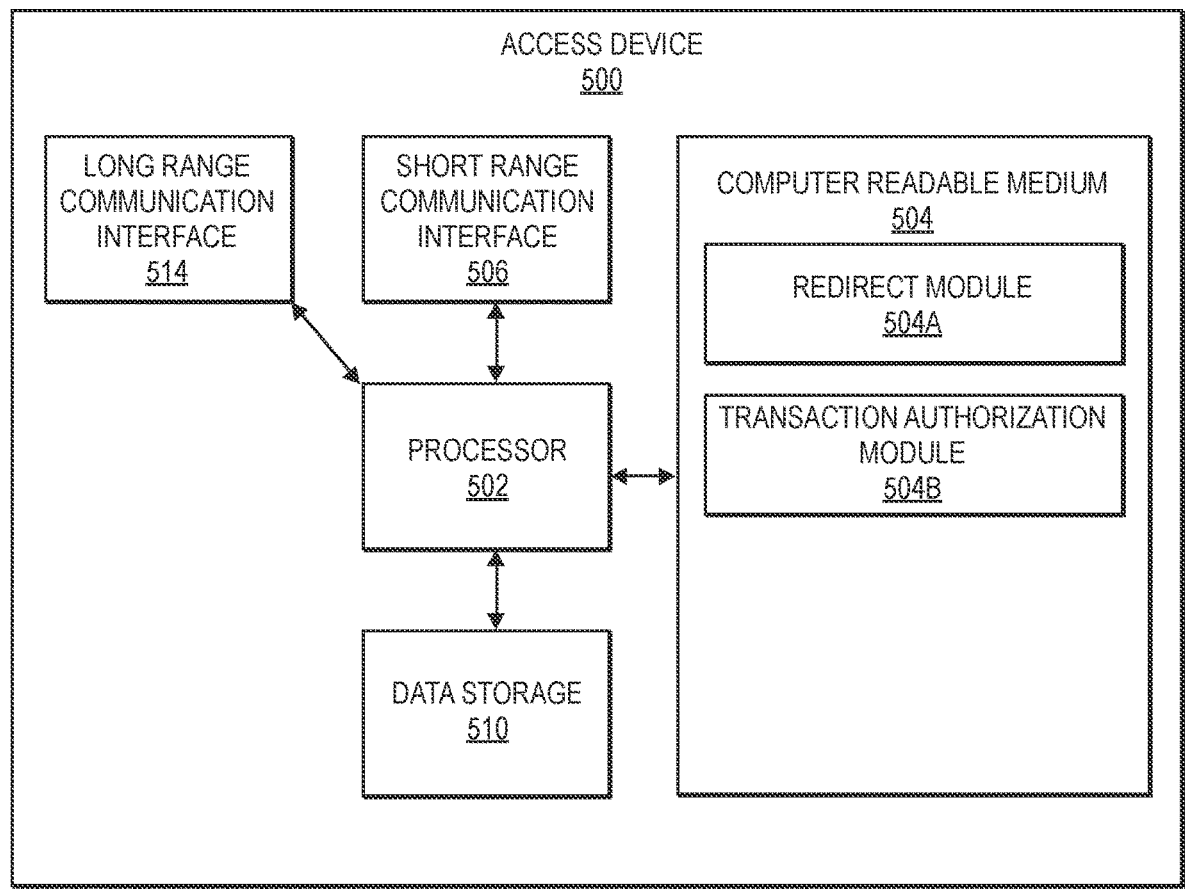
FIG. 5 shows a block diagram of an access device according to embodiments.

FIG. 5 shows a block diagram showing components in an exemplary access device 500. The access device 500 may comprise a processor 502. It may also comprise a computer readable medium 504, a short range communication interface 506, a long range communication interface 514, and a data storage 510 operationally coupled to the processor 502

The computer readable medium 504 may further comprises a redirect module 504A, a transaction authorization module 504B, and a decryption module 504C. The redirect module 504A may comprise software which will allow the access device 500 to redirect a user device to a processing computer or other computers. The transaction authorization module 504B may comprise code, executable by the processor 502, to perform authorization processing for authorization request and response messages.

The computer readable medium 504 may store code or instructions for allowing access device 500 to operate in the manner described herein. The instructions may be executed by the processor 502. For example, the computer readable medium 504 may comprise code or instructions for: receiving, from a processing computer, a list of obscured credentials; receiving, from a user device, a selection of an obscured credential from the list of obscured credentials; transmitting, to the processing computer, the selected obscured credential, wherein the processing computer determines the encrypted data packet corresponding to the selected obscured credential, obtains a second cryptographic key corresponding to the obscured credential, and decrypts the encrypted data packet with the second cryptographic key to obtain the sensitive data; receiving the sensitive data or a derivative thereof from the processing computer; and transmitting the sensitive data or the derivative thereof to an authorizing entity computer for authorization.

Figure 6:
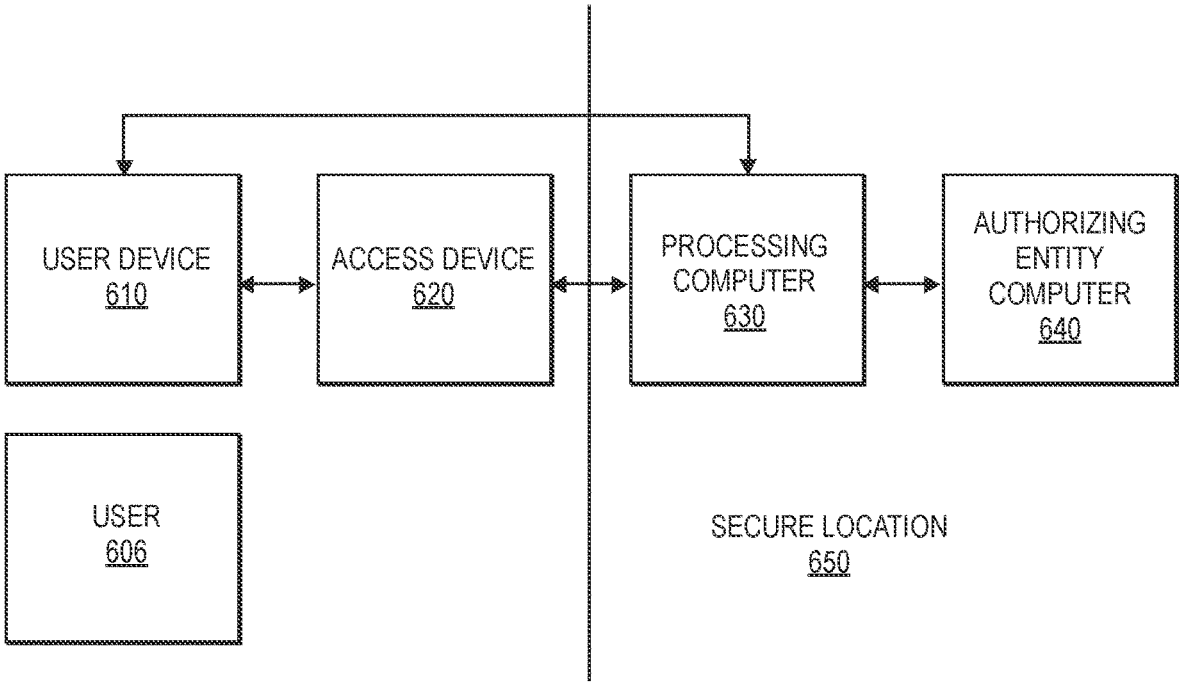
FIG. 6 shows a system illustrating access to a secure location.
Figure 7:
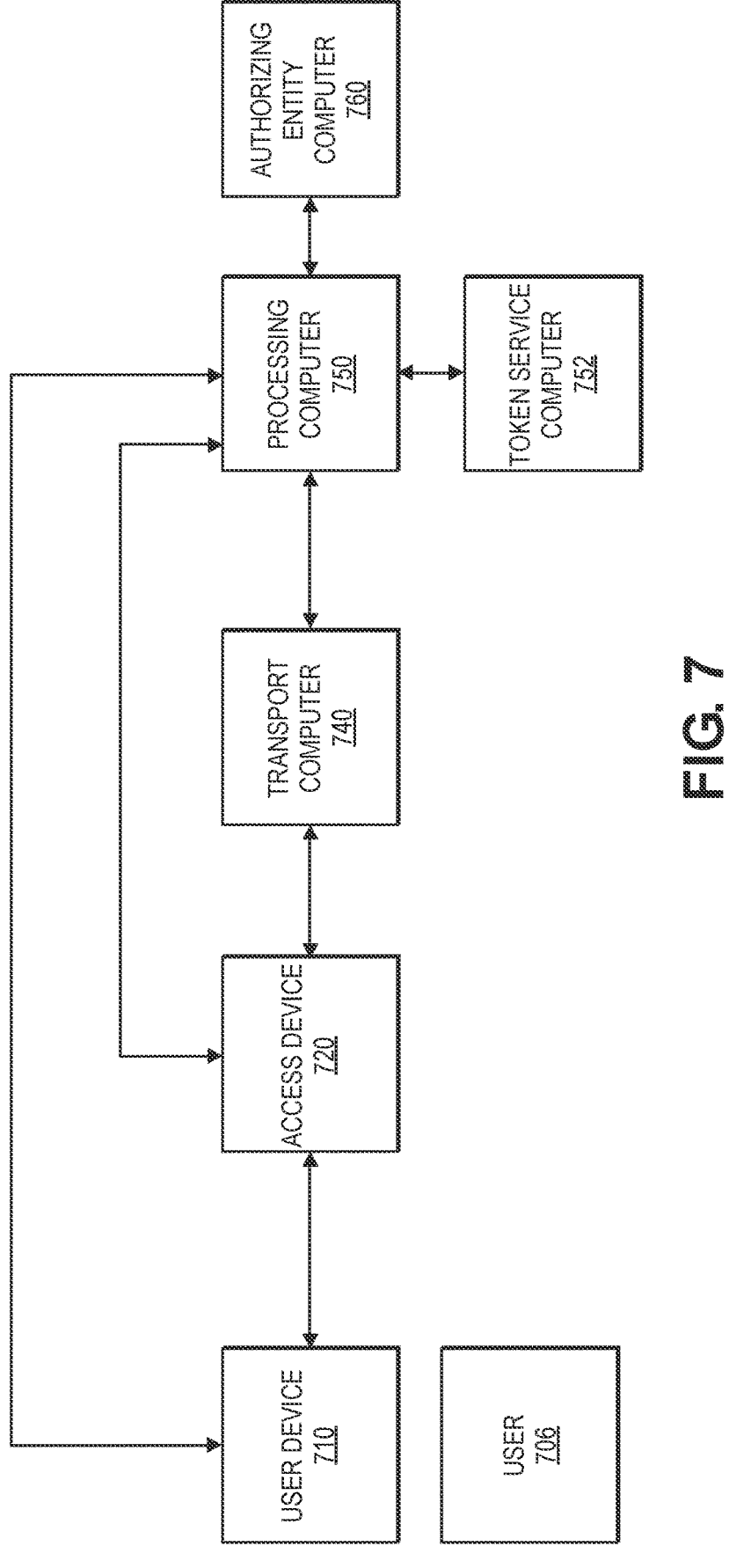
FIG. 7 shows a system illustrating access to a resource such as in a payment transaction.

FIGS. 6 and 7 illustrate how tokens and/or credentials can be used by access devices to continue with transactions once they have been received.

FIG. 6 shows a block diagram of a system that allows a user 606 to access a secure location 650. FIG. 6 shows a user device 610 operated by a user 606. The access device 620 can pass an authorization request message comprising access data comprising a token (or credential) to the processing computer 630. If the authorization request message comprises the token, it may obtain the credential associated with the token and transmit a modified authorization request message with the credential to the authorizing entity computer 640 for authorization. The authorizing entity computer 640 can authorize (or decline) the authorization request message based on predetermined criteria. After that, the authorizing entity computer 640 can transmit an authorization response message back to the access device 620 via the processing computer 630 informing the access device 620 that the user 606 is authorized to access the secure location 650.

FIG. 7 shows a block diagram of a transaction processing system that can use a user device with access data (e.g., a token). FIG. 7 shows a user 706 that can operate a user device 710. The user 706 may use the user device 710 to pay for a good or service at a resource provider such as a merchant. The merchant may operate an access device 720. The merchant may communicate with an authorizing entity computer 760 operated by an issuer, via a transport computer 740 operated by an acquirer and a processing computer 750 that is in a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ can process credit card transactions, debit card transactions, and other types of commercial transactions. VisaNet™ includes a VIP system (Visa Integrated Payments system) which processes authorization requests and a Base II system which performs clearing and settlement services. The payment processing network may use any suitable wired or wireless network, including the Internet.

The access device 720 can obtain access data including a token (or a credential) as described above with respect to FIG. 3. The access device 720 may generate an authorization request message that includes the token along with additional transaction information (e.g., a transaction amount, merchant specific information, etc.), and may transmit it to the processing computer 750 via the transport computer 740.

If the authorization request message comprises the token, then the processing computer 750 (if it does not have a token service module) may contact the token service computer 752 to exchange the token for a real credential (e.g., a PAN). Any authorization request message may then be modified to include the real credential and it may be forward to the authorizing entity computer 760 for authorization. The authorizing entity computer 760 can generate an authorization response message with an approval or decline. The authorization response message can be transmitted to the processing computer 750, and the processing computer 750 may replace the credential with the token. The processing computer 750 may then transmit the authorization response message back to the access device 720.

At the end of the day or at some other suitable time interval, a clearing and settlement process between the transport computer 740, the processing computer 750, and the authorizing entity computer 760 may be performed on the transaction.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving by a processing computer, a set of user data associated with a user, and an encrypted data packet from an authorizing entity computer, the encrypted data packet comprising sensitive data associated with the user encrypted using a first cryptographic key;
storing, by the processing computer, the set of user data associated with the user, and the encrypted data packet;
receiving, by the processing computer from a user device, a request comprising at least some user data in the set of user data;
determining, by the processing computer, the encrypted data packet corresponding to the at least some of the user data;
responsive to determining the encrypted data packet, obtaining, by the processing computer, a second cryptographic key;
decrypting, by the processing computer, the encrypted data packet with the second cryptographic key to obtain the sensitive data; and processing, by the processing computer, a transaction using the sensitive data or a derivative thereof.

2. The method of claim 1, wherein the first cryptographic key is derived from at least some user data in the set of user data.

3. The method of claim 2, wherein obtaining the second cryptographic key comprises deriving the second cryptographic key from the at least some user data in the set of user data.

4. The method of claim 1, wherein the sensitive data comprises a credential.

5. The method of claim 1, wherein the derivative thereof is a token and the sensitive data is a credential.

6. The method of claim 5, further comprising: determining the token with the credential.

7. The method of claim 6, wherein determining the token with the credential comprises mathematically deriving the token using the credential.

8. The method of claim 1, wherein the set of user data comprises contact information of the user.

9. The method of claim 1, wherein the first cryptographic key and the second cryptographic key form a symmetric key pair.

10. The method of claim 1, further comprising, after receiving the request comprising the set of user data and before determining the encrypted data packet:

transmitting, by the processing computer to the user device, an authentication request message;

receiving, by the processing computer, an authentication response message comprising authentication data from the user device; and determining, by the processing computer, that the authentication data is valid.

11. The method of claim 1, wherein processing the transaction using the sensitive data or the derivative thereof comprises transmitting the sensitive data to an access device, wherein the access device transmits an authorization request message to the authorizing entity computer and receives an authorization response message indicating whether or not the transaction is approved.

12. The method of claim 1, wherein the derivative thereof is a token and the sensitive data is a credential, and wherein processing the transaction using the sensitive data or the derivative thereof comprises transmitting the token to an access device, wherein the access device transmits an authorization request message to a processing network computer which determines the credential from the token and modifies the authorization request message to include the token, and transmits the modified authorization request message to the authorizing entity computer and receives an authorization response message indicating whether or not the transaction is approved.

13. The method of claim 1, wherein the sensitive data comprises a credential, and the method further comprises, after receiving the request:

providing, by the processing computer, to an access device operated by a resource provider a list of obscured credentials; and receiving a selection of an obscured credential from the user via the access device, the obscured credential being the credential in obscured form, wherein the encrypted data packet is determined using the selected obscured credential.

14. The method of claim 1, wherein the sensitive data includes data needed to access a secure location.

15. A processing computer comprising:

a processor; and a non-transitory computer readable medium comprising code, executable by the processor, for performing operations comprising:

receiving a set of user data associated with a user, and an encrypted data packet from an authorizing entity computer, the encrypted data packet comprising sensitive data associated with the user encrypted using a first cryptographic key;

storing the set of user data associated with the user, and the encrypted data packet;

receiving, from a user device, a request comprising at least some user data in the set of user data;

determining the encrypted data packet corresponding to the at least some of the user data;

responsive to determining the encrypted data packet, obtaining a second cryptographic key;

decrypting the encrypted data packet with the second cryptographic key to obtain the sensitive data; and processing a transaction using the sensitive data or a derivative thereof.

16. The processing computer of claim 15, wherein the first cryptographic key is derived from at least some user data in the set of user data.

17. The processing computer of claim 15, wherein the first cryptographic key is derived from at least some user data in the set of user data, and wherein the first cryptographic key and the second cryptographic key form a symmetric key pair.

18. A method comprising:

receiving, by an access device from a processing computer, a list of obscured credentials;

receiving, by the access device from a user device, a selection of an obscured credential from the list of obscured credentials;

transmitting, by the access device to the processing computer, the selected obscured credential, wherein the processing computer determines an encrypted data packet corresponding to the selected obscured credential, obtains a second cryptographic key corresponding to the obscured credential, and decrypts the encrypted data packet with the second cryptographic key to obtain sensitive data;

receiving, by the access device, the sensitive data or a derivative thereof from the processing computer; and transmitting, by the access device, the sensitive data or the derivative thereof to an authorizing entity computer for authorization.

19. The method of claim 18, wherein the sensitive data comprises a credential that is associated with the selected obscured credential.

20. The method of claim 18, wherein the derivative thereof is a token corresponding to a credential, the selected obscured credential being the credential in obscured form.

* * * * *